United States Patent [19]
Chivers

[11] 3,762,846
[45] Oct. 2, 1973

[54] PROCESS AND APPARATUS FOR MAKING CANDY FLOSS
[75] Inventor: Thomas E. Chivers, Osseo, Minn.
[73] Assignee: General Mills Inc., Minneapolis, Minn.
[22] Filed: Sept. 18, 1970
[21] Appl. No.: 73,612

Related U.S. Application Data
[62] Division of Ser. No. 730,057, May 17, 1968, Pat. No. 3,557,717.

[52] U.S. Cl. .............................. 425/7, 99/516
[51] Int. Cl. .............................. A23g 7/00
[58] Field of Search .................... 425/6, 7

[56] References Cited
UNITED STATES PATENTS
2,209,964  8/1940  Ferguson ........................ 425/7 X
3,017,664  1/1962  Ladisch ........................... 425/7 X
3,430,289  3/1969  Aikawa et al. .................. 425/6

Primary Examiner—J. Spencer Overholser
Assistant Examiner—David S. Safran
Attorney—Anthony A. Juettner, William C. Babcocke and L. Me Ray Lillehaugen

[57] ABSTRACT

Process and apparatus for making candy floss from a cooked slurry or syrup, containing sugar and water, and if desired, other flavoring and/or coloring ingredients. Most of the moisture is removed from the slurry by cooking the slurry at a high temperature. A pressurized gaseous medium such as air, is used to diffuse the cooked candy as it is sprayed from a discharge opening, and convert it into floss form.

2 Claims, 3 Drawing Figures

PATENTED OCT 2 1973 3,762,846
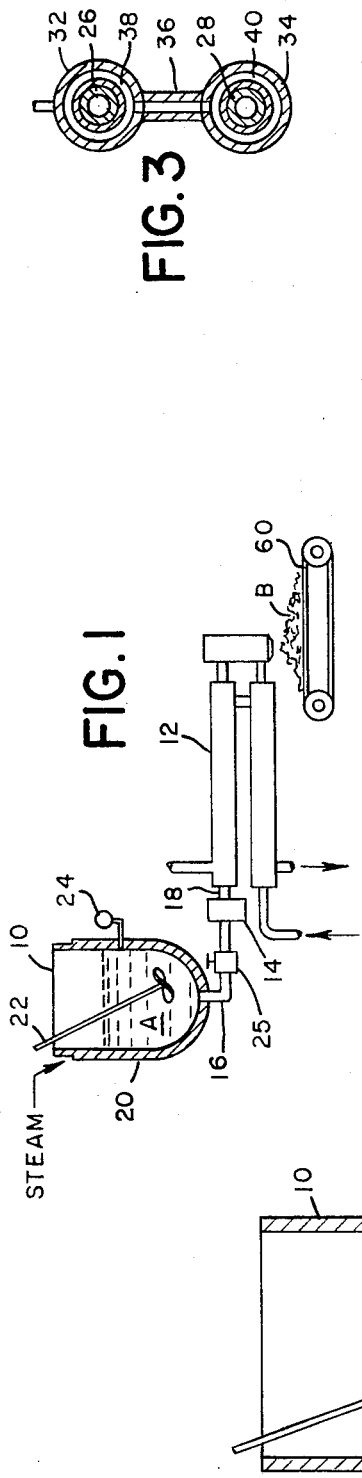
FIG. 1
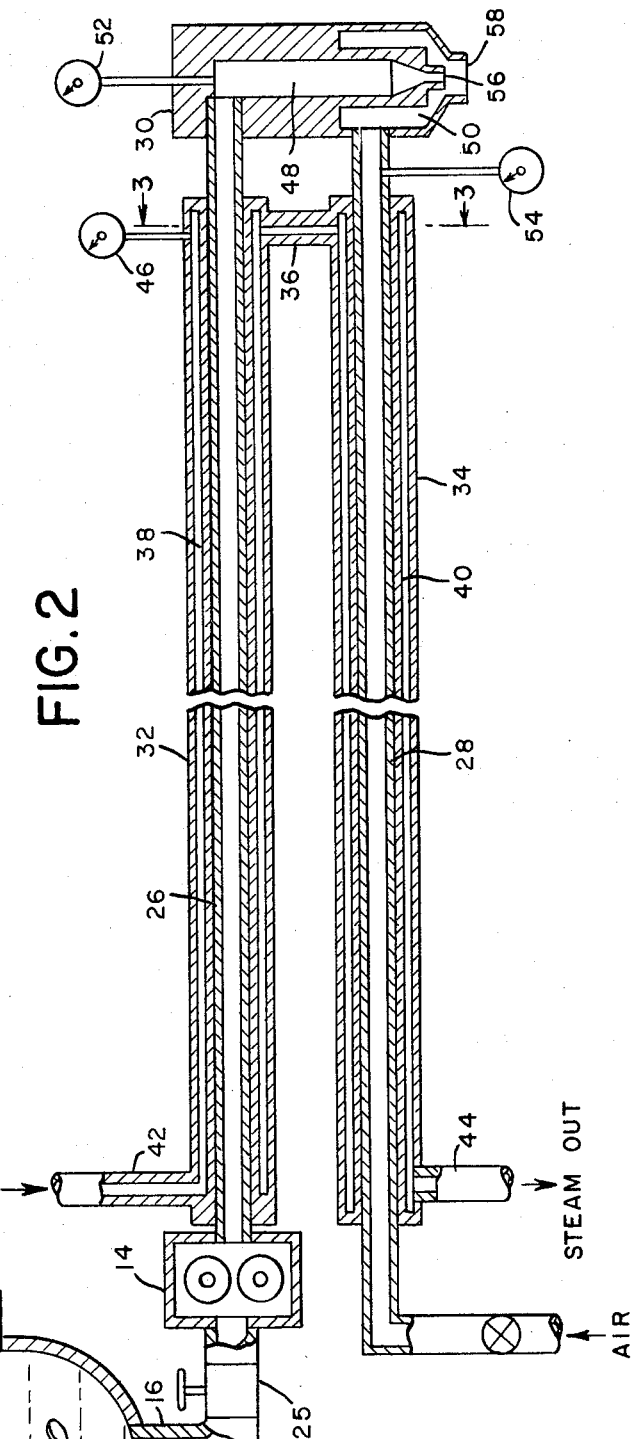
FIG. 3
FIG. 2

PROCESS AND APPARATUS FOR MAKING CANDY FLOSS

This application is a division of application Ser. No. 730,057 filed May 17, 1968, now U.S. Pat. 3,557,717.

The present invention relates to a process and apparatus for making candy floss, and more particularly to the formation of candy floss or cotton candy from a molten liquid slurry or syrup containing at least sugar and water.

Cotton candy or sugar floss in the form of fine fluffy filaments of sugar is customarily made from ordinary cane sugar. According to the known prior art, the floss is formed by employing a rotative vessel in which the sugar particles are placed and heated to reduce the sugar to a molten state. By spinning the vessel, the sugar is ejected by centrifugal force in thread-like filaments through appropriate openings in the vessel wall, to produce the cotton candy.

As known, the above technique has been employed for years in making cotton candy for immediate consumption. It has been discovered that cotton candy, in which the sugar is in a non-crystalline or amorphous state, can be used for other purposes in the food industry as well, e.g., for coating or enrobing a product or article. It has been found that the formation of candy floss by the commonly known spinning technique has certain limitations and disadvantages. For one thing, the sugar must be quite dry, as too much moisture might adversely affect the spinning operation. Moreover, when the candy floss is to be used for coating or enrobing purposes, it is ofttimes desirable to impart a different flavor or a different hue to the coated product, than that available by forming cotton candy in accordance with the known prior art techniques. Attempts have been made to color the sugar particles with a suitable edible dye; this however, has not always worked with optimum results. Furthermore, it is difficult to produce candy floss having different flavors, by utilizing the spinning technique.

Accordingly, one object of the present invention is to provide a new and improved process for making candy floss.

Another object is to provide a process for making candy floss from a molten liquid slurry containing at least sugar and water.

A further object is to provide a process for making candy floss wherein the color of the floss can be easily varied.

A still further object is to provide a process for making candy floss wherein the flavor of the floss can be readily varied.

Another object is to provide an apparatus for making candy floss from a molten liquid slurry.

Other objects and advantages will become apparent from a consideration of the following specification and drawings. Before proceeding with a detailed description of the invention however, a brief description of it will be presented.

In general, the invention concerns making candy floss from a slurry containing sugar, water, and if desired, one or more flavoring and/or coloring ingredients. Preferably, the slurry is blended and heated at a first temperature to form a molten slurry, after which it is cooked or boiled at a substantially higher temperature so that the moisture content is reduced to at least 1.5 percent or less. After cooking the molten candy is discharged under pressure through a discharge opening in the cooker, at which point most of the moisture contained in the molten candy flashes off or varporizes. A pressurized heated gaseous medium is directed toward the discharge opening in such a manner that the molten candy is diffused as it is discharged from the opening, and thus formed into fine filaments of candy floss.

the invention will best be understood by reference to the following drawings wherein:

FIG. 1 is a diagrammatic view showing apparatus for carrying out the process of this invention;

FIG. 2 is an enlarged schematic view illustrating a heat exchange unit or cooking apparatus in greater detail; and FIG. 3 is an enlarged sectional view taken along line 3—3 of FIG. 2.

FIG. 1 illustrates apparatus for practicing the present invention, which includes a steam jacketed receptacle or make-up kettle 10, a heat exchange unit or cooker 12, and a feed pump 14 interposed between the kettle 10 and the cooker 12, and operatively connected thereto by conduits 16 and 18. The kettle is provided with a steam jacket 20 so that steam might be introduced to heat the contents in the kettle to a prescribed temperature, and thus form a molten slurry or syrup designated by letter A. A beater or agitator 22 is provided for stirring or mixing the ingredients within the kettle. A temperature gauge 24 indicates the temperature of the ingredients within the kettle. It should be recognized of course, that other means might be utilized for heating the kettle; a steam jacket provides a convenient way for raising the temperature of the slurry to a desired level.

The pump is provided for transferring the molten slurry from the kettle to the cooker 12 through conduits 16 and 18. Preferably the pump 14, as well as the conduits, are steam jacketed or otherwise heated to minimize heat loss of the slurry as it is being transferred. A valve 25 is provided for controlling the flow of the slurry from the kettle. The pump 14 might be any conventional sanitary pump suitable for use with foods; its capacity should be such as to provide a flow equivalent to the throughput rate of the system at the desired output pressure.

The cooker 12 provides a chamber for cooking the molten slurry and for raising its temperature to such a magnitude that most of the moisture in the slurry is flashed off or vaporized when the slurry is discharged from the cooker. FIGS. 2 and 3 illustrate the cooker 12 in somewhat greater detail. Generally, the cooker 12 includes a first elongate cooking chamber or conduit 26 for containing the molten slurry, a second elongate conduit 28 for containing a pressurized gaseous medium such as air, and an atomizing nozzle 30 operatively connected to each of the conduits for discharging the slurry and the pressurized air. Steam jackets 32 and 34 surround the conduits 26 and 28 respectively, and they are connected together by a conduit 36 which provides a passage between them. The steam jacket 32 has an annular passage 38 for containing steam, and the steam jacket 34 has an annular passage 40 for likewise containing steam. Steam is introduced into the jacket 32 at inlet 42, and discharged from the jacket 34 through outlet 44. A pressure gauge 46 is provided for indicating the pressure of the steam within the jackets. As depicted, the conduit 26 is connected to the discharge opening of the pump 14, and the steam jacket 32 covers substantially the entire length of the conduit 26 so as to minimize heat loss, and to adequately heat the entire chamber. The length of the conduits 26 and 28 can vary, depending upon the desired cook time, the pressure exerted by the pump, the heat and pressure of the steam, and the like.

The nozzle 30 is provided for discharging the molten candy from the conduit 26 under pressure, and for atomizing or diffusing the molten candy by subjecting it to a stream of pressurized air. Various nozzles of this type are commercially available, and will not be described in detail. Illustrative of the types which might satisfactorily be used are nozzles manufactured by Spraying Systems Co., of Bellwood, Ill. Such nozzles are shown for example in Calalog 25 entitled "Industrial Spray Nozzles and Accessories," Copyright 1963. Briefly, the nozzle includes a first passage 48 which communicates with the conduit 26, and a second annular passage 50 which communicates with the conduit 28. As the molten product is discharged through the passage 48 and opening 56, it is diffused by the air discharged through the passage 50 and opening 58. The rate of air flow is not overly critical; it has been found that too little air causes liquid droplets which become sticky. As the air increases, the droplets disappear.

A temperature gauge 52 is provided for indicating the temperature of the product as it enters the nozzle 30, and a temperature gauge 54 indicates the temperature of the gaseous medium in the conduit 28.

Before describing the operation of the apparatus in detail, the ingredients out of which the slurry A is formed will be briefly described. It has been discovered that the candy floss formed by practicing the invention can be used with excellent results for coating various products such as ready-to-eat food pieces. Grinding of the floss and applying it onto the surface of such pieces results in flavorful and colorful pieces. For this reason, it might be desirable to make the slurry out of a number of ingredients, so as to provide unique and different flavors and colors. The slurry might be formed by combining only sugar and water, e.g., 85–90 percent sucrose and about 10–15 percent water, or by including one or more flavoring and/or coloring ingredients such as brown sugar, corn syrup, molasses, butter, salt, bicarbonate of soda, or the like. Generally, granulated sucrose has been used with good results; although other sugars, such as dextrose, might be used as well. Most commercially available light or dark brown sugars can be used; and most commercially available corn syrups can be used, (although a high maltose syrup is preferred). The amounts of each ingredient can vary, depending upon the exact flavor or color desired. For example, it might be desirable to combine white granulated sugar and brown sugar in equal amounts, with corn syrup, water, and other ingredients; or if preferred, only one of the sugars might be used in the formulation. In most instances, the water should preferably comprise about 10–15 percent of the slurry. If too much water is provided, it becomes more difficult to reduce the moisture of the molten candy to the desired level, e.g. 1.5 percent or less. If only crystalline sugar and water are used to form the slurry, the resulting candy floss is comprised primarily of sugar in a non-crystalline, amorphous state since most of the moisture is removed. If the slurry formulation includes other ingredients such as corn syrup, the actual amount of such other ingredients contained in the final product might vary, depending upon the amount of moisture contained in the ingredient originally. Syrup for example, contains a certain amount of solids, and a certain amount of moisture, e.g., 20 percent substantially all of this moisture is ultimately removed.

In operation, the ingredients out of which the candy floss is formed, such as sugar and water, are mixed together in the jacketed kettle 10 to form a slurry A. Steam is introduced into the jacket 20 so that the kettle is heated, and the slurry formed into molten candy by raising the temperature of the slurry at atmospheric pressure, to about 190°–220°F., and more preferably to about 200–210°F. When heated to this temperature, the sugar dissolves in the water to form a relatively thick slurry, and part of the moisture contained therein evaporates. After the desired temperature of the slurry is reached, it is maintained at that level in the kettle during the floss-forming operation. Steam is introduced into the jacket 32 at inlet 42, and it has a temperature of sufficient magnitude to heat the contents in the conduit 26 to a temperature of at least 325°F., and preferably higher. The steam exits through outlet 44. Air is introduced into the conduit 28 and it is likewise heated to an elevated temperature, by the hot steam in the jacket 34. By opening the valve 25, the heated slurry is removed from the kettle 10 by means of the pump 14 into the cooker 12, and more specifically the jacketed chamber 26, at a desired feed rate.

As the heated slurry is pumped through the heated chamber 26, it is cooked and formed into a molten candy. As it is discharged from the atomizing nozzle 30 under pressure, it is diffused by the heated pressurized air flowing through the conduit 28, and formed into fine filaments of candy floss. It might be pointed out that if desired, the pressurized air need not be heated; it has been found however, that when cool air is used, there is a tendency for the candy floss to collect on the nozzle 30. The filaments of candy floss, designated by letter B in FIG. 1, are collected on a conveyor 60, or other appropriate collection apparatus.

As the hot molten candy is forced through the nozzle 30, most of the moisture flashes off or vaporizes as it leaves the nozzle and is exposed to the atmosphere. The amount of moisture retained in the candy depends on the ultimate temperature of the molten candy; by raising the temperature of the candy to higher levels, greater amounts of moisture can be flashed off. By heating the candy to a temperature of 340°F. for example, the moisture content can be reduced to less than 1 percent, whereas by raising the temperature to only 300°F., at least 3 percent moisture is retained in the candy floss, which is too high to retain the filaments in floss form under normal operating conditions. If the cooking temperature is only raised to about 280°F., about 5 percent moisture is retained in the floss; under most conditions, such floss will fuse into a hard candy mass almost immediately.

As known to those skilled in the candy art, hard candy is made by cooking crystalline sugar and water (and other ingredients if desired) and changing the sugar into an amorphous, non-crystalline state by subjecting it to a high cooking temperature, thereby removing most of the moisture e.g., as low as 3 percent by weight. While in the non-crystalline state, such candy is normally quite hygroscopic; for this reason, ambient humidity and temperature conditions are often important factors to be considered both during and after manufacture of the floss. Various procedures and steps have been taken to minimize the disadvantages caused by the hygroscopicity of hard candy. As known, candy floss is a form of hard candy as it is comprised of sugar in a non-crystalline, amorphous state; as such, it is quite hygroscopic. It has been discovered that when forming candy floss in the manner described above, it is essential that the moisture content of the molten candy be reduced to an extremely small amount, at least 1.5 percent and preferably less. As pointed out above, if too much moisture is retained in the floss, it will not remain in filaments but will fuse into a mass or lump of hard candy. Furthermore, best results are obtained when the floss is produced in an environment in which the relative humidity is quite low, e.g., 25–35 percent, and the temperature is not too high, e.g., 65°–75°F.

The invention will be better understood by reference to the following examples:

EXAMPLE I

A slurry was formed by combining and mixing 12 pounds of brown sugar with 2 pounds of corn syrup, 2 pounds of water, 0.4 pounds of molasses, 0.2 pounds of salt, and 0.1 pound of bicarbonate of soda. These ingredients were then heated and cooked at atmospheric pressure to a temperature of about 200°–205°F. in a steam-jacketed make-up kettle. The heated slurry was then pumped into a first end of an elongate jacketed cooker having a first conduit or cooking chamber, at a feed rate of about 18–20 pounds per hour and a pressure of at least 10 psi. The cooker was heated by introducing steam having a pressure of about 180 psi. into the jacket. The heated slurry was formed into a molten candy in the cooker by raising its temperature to about 340°F. As the molten candy flowed through the cooking chamber, it was discharged through a discharge opening or atomizing nozzle in the second end of the cooker, at which point most of the moisture in the molten candy flashed off so that its moisture content was reduced to less than 1 percent. Air was supplied to a second conduit in the cooker at a feed rate of about 2 scfm., and it was likewise heated to an elevated temperature of about 360°–380°F., by the hot steam. The heated air was discharged through the atomizing nozzle in such a manner that it was directed against the molten candy being discharged. The pressurized air diffused or atomized the droplets of molten candy and formed it into fine filaments of candy floss. The operation was conducted in a room having a relative humidity of about 30 percent, and a temperature of about 70°F. The candy floss thus formed contained about 82–85% brown sugar, about 10–12% corn syrup solids, about 1.5–2.5% molasses solids, about 1.0–1.5 percent salt, about 0.5–1.0% soda, and less than 1% moisture.

EXAMPLE II

A syrup was prepared similar to that of Example I by combining and mixing 6 pounds of brown sugar and 6 pounds of granulated sucrose with 3 pounds of corn syrup, 2 pounds of water, 0.2 pounds of salt, and 0.1 pound of soda. These ingredients were blended together and heated to a temperature of about 200°F., after which they were cooked at a temperature of about 325°F. and formed into a molten candy, in substantially the same general manner described in Example I. Moisture contained in the molten candy flashed off when the candy was discharged from the cooker nozzle so that less than 1.5% moisture was retained in the candy floss. By diffusing the molten candy with heated, pressurized air, filaments of candy floss were formed having a slightly different flavor and color, when compared to that formed in Example I.

EXAMPLE III

The procedure set forth in Example I was generally followed except that the slurry contained about 20 pounds of granulated sucrose and 3 pounds of water. During the initial heating step, the sucrose dissolved in the water, and part of the water evaporated. The slurry was pumped into a cooking chamber where its temperature was raised to about 350°F. When discharged from the cooker, all but about 0.5 to 1.0 percent of the moisture vaporized. The molten candy was formed into filaments of candy floss by diffusing it with pressurized air heated to a temperature of about 325°F. The resulting product was quite similar to the typical cotton candy formed by using a heated, spinning vessel; moreover, the final product contained primarily a single ingredient, i.e., sucrose.

EXAMPLE IV

A carmel-flavored candy floss was formed by cooking a heated slurry containing 12 pounds of granulated sugar, 3 pounds of corn syrup, 4 pounds of butter, and 2 pounds of water, at a temperature of about 340°F. When discharged from the cooker and diffused with heated pressurized air, filaments of candy floss were formed which were uniquely different in flavor from the products produced in the above examples.

EXAMPLE V

The slurry formulation described in Example I was modified by using 12 pounds of brown sugar, 3 pounds of corn cyrup, and 2 pounds of water. The procedure described in Example I was then followed to form filaments of candy floss comprised of about 81–84 percent sugar, about 15–18 percent by weight corn syrup solids, and less than 1 percent water.

while the candy floss formed in each of the foregoing examples can be consumed immediately if desired, it has been discovered that when further processed, e.g., by grinding it into granular or powder form, it makes an excellent coating for food products. As described above, the candy floss can be made in a variety of flavors and colors, by varying the formulation of the slurry.

In the above description and attached drawings, a disclosure of the principles of this invention is presented, together with some of the specific examples by which the invention might be carried out.

Now, therefore, I claim:

1. Apparatus for forming candy floss comprising a receptacle for containing a slurry including at least sugar and water, means for heating the contents in the receptacle to a first prescribed temperature, a cooking chamber for raising the temperature of the slurry to a second prescribed level, said cooking chamber having a discharge nozzle for discharging the slurry from said chamber, conduit means for operatively connecting said cooking chamber to the receptacle, pump means interposed between said receptacle and said cooker and connected to said conduit for transferring the slurry under pressure from said receptacle to said cooking chamber, means for heating the contents in the cooking chamber to a temperature of at least 325°F., and means for directing a heated gaseous medium against the slurry as it passes through the discharge nozzle.

2. The combination of claim 1 wherein the cooking chamber is steam jacketed, and it is heated to the desired temperature by introducing steam into the steam jacket.

* * * * *